United States Patent [19]
Lee et al.

[11] Patent Number: 6,157,244
[45] Date of Patent: *Dec. 5, 2000

[54] POWER SUPPLY INDEPENDENT TEMPERATURE SENSOR

[75] Inventors: Thomas H. Lee, Cupertino; Mark G. Johnson, Los Altos; John C. Holst, San Jose, all of Calif.

[73] Assignee: Advanced Micro Devices, Inc., Sunnyvale, Calif.

[ * ] Notice: This patent is subject to a terminal disclaimer.

[21] Appl. No.: 09/170,335

[22] Filed: Oct. 13, 1998

[51] Int. Cl.[7] ........................................................ G05F 1/10
[52] U.S. Cl. ........................... 327/539; 327/83; 327/513; 374/178; 323/313
[58] Field of Search ........................... 327/512, 513, 327/83, 77, 63, 51, 66, 538, 539; 374/163, 172, 176, 178; 257/467, 470; 323/313, 312, 314

[56] References Cited

U.S. PATENT DOCUMENTS

| | | | |
|---|---|---|---|
| 4,277,975 | 7/1981 | Pinkham | 374/170 |
| 4,918,505 | 4/1990 | Blouke et al. | 257/244 |
| 4,943,559 | 7/1990 | Severin et al. | 505/161 |
| 5,084,665 | 1/1992 | Dixon et al. | 323/281 |
| 5,295,746 | 3/1994 | Friauf et al. | 374/170 |
| 5,655,305 | 8/1997 | Fletcher | 374/170 |
| 5,961,215 | 10/1999 | Lee et al. | 374/178 |

OTHER PUBLICATIONS

P. Gray, R. Meyer, Analysis and Design of Analog Integrated Circuits, 3rd Ed., Chapter 4, Section A4.3.2. "Band–Gap–Referencing Biasing Circuits" pp. 338–346 (1993).

B. Song, P. Gray "A Precision Curvature–Compensated CMOS Bandgap Reference", IEEE Journal of Solid–State Circuits, vol. SC–18, No. 6, pp. 634–643 (Dec., 1983).

Primary Examiner—Timothy P. Callahan
Assistant Examiner—Minh Nguyen
Attorney, Agent, or Firm—Skjerven, Morrill, MacPherson LLP

[57] ABSTRACT

A temperature sensor is fabricated in an integrated circuit in combination with another device such as a microprocessor using a fabrication technology that is suitable for fabricating the device. Operation of the temperature sensor is based on the bandgap physics of semiconductors using a bandgap reference circuit and an amplifier that generate two measurement voltages, a voltage that is temperature-dependent and a voltage that is temperature-independent. The temperature sensor includes a bandgap power supply circuit that supplies a power supply voltage that is very stable to drive the temperature sensor so that the temperature sensor generates an output signal that is essentially independent of the power supply voltage.

22 Claims, 8 Drawing Sheets

POWER SUPPLY INDEPENDENT TEMPERATURE SENSOR

BACKGROUND OF THE INVENTION

1. Field of the Invention

The present invention relates to electronic integrated circuits. More specifically, the present invention relates to electronic integrated circuits including a temperature sensor.

2. Description of the Related Art

Microprocessor architectures are continually evolving to improve and extend the capabilities of personal computers. Execution speed, power consumption, and circuit size are aspects of microprocessors and microprocessor performance that are constantly addressed by processor architects and designers in the ongoing quest for an improved product. As microprocessor circuits grow in size, increase in density, and accelerate in execution speed, exceeding 200–500 MHz and continuing to increase, the maintenance of a suitable operating temperature is an important design consideration.

Maintaining a suitable operating temperature is highly important design consideration in microprocessor-based computer systems. Designers typically use mechanical devices, such as fans or heat sinks, to maintain a cool operating temperature. Some systems, such as many portable computer systems, do not use a fan or do not have sufficient area to house a large heat sink so that the microprocessor circuit often operates near to the upper range of operating temperature limits. When a microprocessor operates at a temperature above the operating limit, data errors or reliability problems may occur due to stress on operating speed paths.

To avoid such errors, a computer system may include a temperature sensor to monitor the internal environment of the computer system. If the temperature reaches a level above prescribed limits, automatic temperature management utilities may be invoked to disable clock signals, actuate a cooling fan, or other similar operations, to reduce the operating temperature to a suitable range.

A first type of conventional temperature sensors, including digital thermometers, typically measure temperature by exploiting the thermal-voltage characteristics of a diode. The voltage drop across a diode falls as a function of temperature as the diode is forward-biased by a constant current. The voltage-temperature relationship reflects a temperature coefficient that may be employed to measure temperature in a temperature sensor. The temperature coefficient of a diode is generally a constant value illustrating a relationship that voltage decreases as temperature increases. A typical temperature coefficient is about −2 mV/° C. The first type of conventional temperature sensors normally generate an output signal that increases with increasing temperature. The voltage drop across a diode does not supply a suitable output signal since it decreases with increasing temperature.

In one embodiment of a diode-based temperature sensor, a diode is constructed as a source-drain of an output driver. The diode has a temperature dependence so that a voltage placed on one terminal of the diode results in a measurable current flow that is a function of temperature. Unfortunately, the current is an exponential function of voltage, so that any noise, such as digital noise occurring during operation of a microprocessor, is amplified in an exponential manner so that noise signals completely overpower voltage signals arising from temperature. Generally, an accurate temperature measurement is performed only by terminating all operations of a circuit, allowing signals to settle, then making a temperature measurement reading. The decay of the current is tracked and a curve is fit to determine the temperature at the time operations are terminated. The diode measurement technique is complicated and accurate measurements are difficult to achieve. Real-time measurements are virtually impossible to achieve.

A second type of conventional temperature sensor generates a voltage drop of two diodes with different current densities, either by applying the same current to different sized diodes or by applying different currents to identically sized diodes. The diode with a higher current density has a relatively smaller absolute value temperature coefficient than the other diode. However, the two diodes have the same voltage drop at absolute zero. As temperature increases, the relative difference between the voltage drops of the two diodes increases in a linear manner. The conventional temperature sensor includes a differential amplifier that receives the voltage drops of the diodes and generates an output signal representing the difference between the voltage drops. The output signal linearly increases as temperature increases.

CMOS technology is typically used to fabricate microprocessors due to considerations of low DC power dissipation, high noise margin, wide temperature and voltage ranges, overall circuit simplification, layout ease, and high packing density. In contrast, bipolar technology is generally used to construct temperature sensors, using diode-connected bipolar transistors to provide the temperature coefficient as base-emitter voltage ($V_{BE}$) as a function of temperature. Therefore, temperature sensors and microprocessors are usually implemented in separate technologies with the temperature sensor positioned one or two inches from the microprocessor due to packaging constraints. The distance between the microprocessor and the temperature sensor greatly reduces the accuracy of the microprocessor temperature operating condition. The temperature sensed by the temperature sensor is skewed by the ambient temperature and the temperature of circuits nearer to the sensor than the microprocessor.

BiCMOS technology apparently would allow integration of CMOS and bipolar technologies feasible, but a tradeoff between process complexity and device quality generally renders BiCMOS unacceptable for microprocessor usage.

A third temperature sensing technique employs a ring oscillator that is very sensitive to temperature differences. The output signal from the ring oscillator is buffered and the frequency of the oscillator output signal is measured. The circuit temperature varies based on the measured frequency. Unfortunately, the functionality of the ring oscillator is highly process dependent and varies with several variables including polysilicon resistance and channel length. To accurately calibrate a ring oscillator temperature sensor, the individual devices are to be characterized, the characterization parameters stored, and calibration operations carried out, greatly complicating the measurement of temperature in a production environment.

What is needed is an improved temperature sensor that more accurately senses a microprocessor temperature than conventional approaches.

SUMMARY

A temperature sensor and microprocessor are fabricated in a single integrated circuit chip. The integral formation of the microprocessor and temperature sensor inherently results in an increased-accuracy measurement of temperature in the microprocessor. Accuracy of the microprocessor temperature measurement is maintained even if the fabrication process of the microprocessor and sensor is modified, the gate critical dimensions (CDs) are changed, or the like. Operation of the temperature sensor is independent of the fabrication process of the microprocessor integrated circuit since the temperature measurement is based on the bandgap physics of semiconductors.

In accordance with one aspect of the present invention, a temperature sensor is fabricated in an integrated circuit in combination with another device such as a microprocessor using a fabrication technology that is suitable for fabricating the device. Operation of the temperature sensor is based on the bandgap physics of semiconductors using a bandgap reference circuit and an amplifier that generate two measurement voltages, a voltage that is temperature-dependent and a voltage that is temperature-independent. The temperature sensor includes a bandgap power supply circuit that supplies a power supply voltage that is very stable to drive the temperature sensor so that the temperature sensor generates an output signal that is essentially independent of the power supply voltage.

In accordance with one embodiment of the present invention, a temperature sensor includes a bandgap reference circuit generating a temperature-independent reference voltage, a biasing circuit connected to the bandgap reference circuit and generating a temperature-dependent biasing voltage, a bandgap power supply circuit supplying a constant supply voltage to the bandgap reference circuit and the biasing circuit, and an amplifier generating a temperature-dependent output voltage as a function of the reference voltage and the biasing voltage. The bandgap reference circuit includes a current mirror mirroring a current in the bandgap reference circuit.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

DETAILED DESCRIPTION OF THE ILLUSTRATIVE EMBODIMENTS

Figure 1:
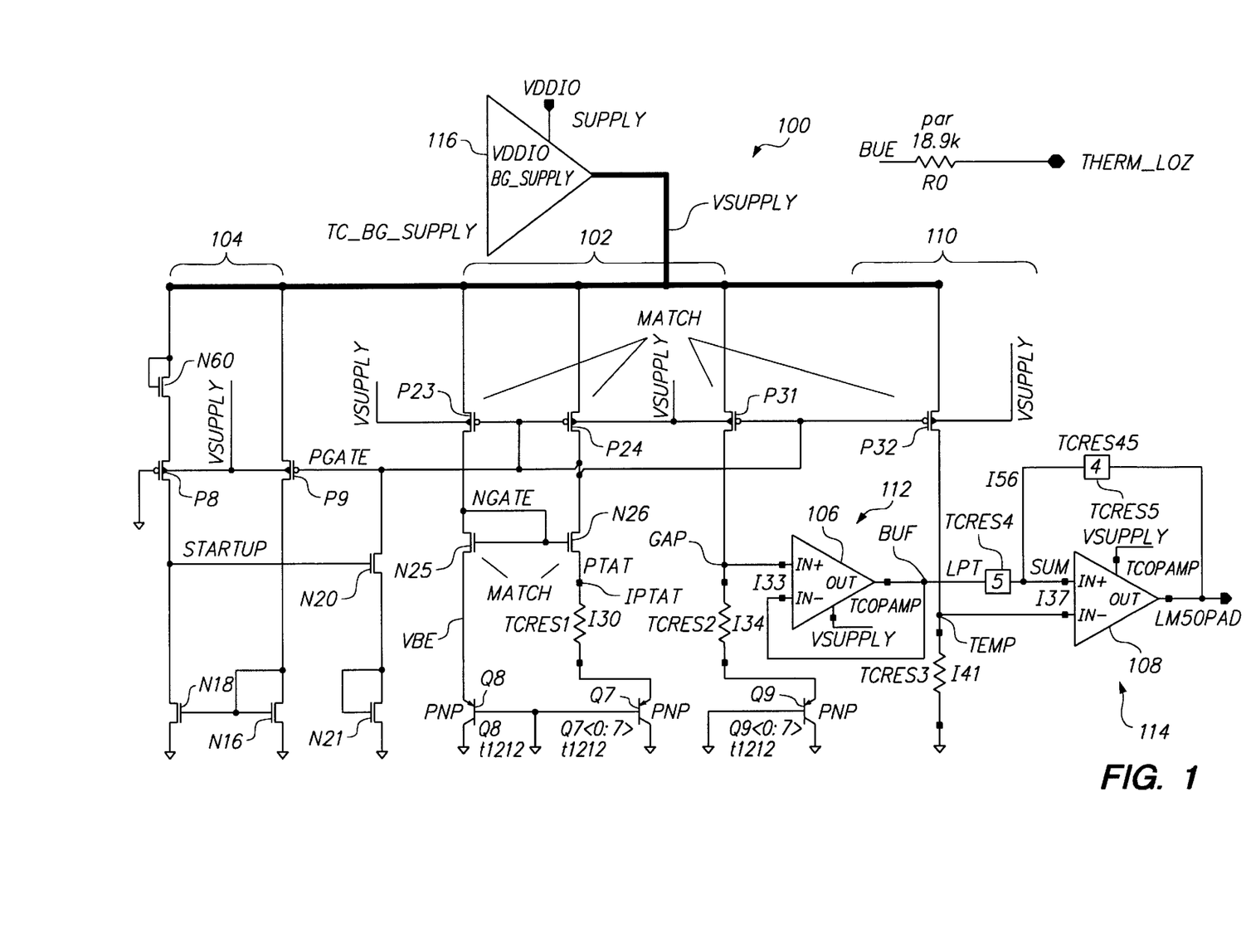
FIG. 1 is a schematic circuit diagram illustrating a temperature sensor in accordance with an embodiment of the present invention

Referring to FIG. 1, a schematic circuit diagram illustrates a power supply independent temperature sensor 100 in accordance with an embodiment of the present invention. In the illustrative embodiment, the power supply independent temperature sensor 100 is defined to generate an output voltage having the same specification as a commercially-available temperature sensor circuit, an LM50 temperature sensor circuit which is available from National Semiconductor of Santa Clara, Calif. The temperature sensor is specified to generate an output voltage of 500 mV for a temperature of 0°C and an output voltage of 1.5V for a temperature of 100°C, and having an essentially linear relationship between temperature and voltage that varies at approximately 10 mV per °C.

The illustrative power supply independent temperature sensor 100 senses temperature through the operation of a band gap reference circuit 102. The power supply independent temperature sensor 100 includes a start-up circuit 104, the band gap reference circuit 102 that produces a constant voltage independent of temperature at node RAWGAP, a buffer 112, a biasing circuit 110, a temperature signal amplifier 114, and a bandgap power supply circuit 116.

The start-up circuit 104 includes two P-channel MOS field effect transistors P8 and P9, and four N-channel MOS field effect transistors N20, N18, N16 and N21. On application of power, the start-up circuit 104 drives the bandgap reference circuit 102 to a known and stable operating state.

The band gap reference circuit 102 includes a plurality of transistors that have gate terminals connected to a PGATE line. Specifically, the bandgap reference circuit 102 includes three P-channel MOS transistors P23, P24 and P31, two N-channel MOS transistors N25 and N26, two resistors TCRES1 and TCRES2, and three diode-connected PNP bipolar transistors Q8, Q7<0:8> and Q9<0:8>. The gates of P-channel MOS field effect transistors P23, P24, and P31 in the bandgap reference circuit 102 and P-channel MOS field effect transistor P32 in the biasing circuit 110 are connected to the drain of P-channel MOS field effect transistor P24 so that the P-channel MOS field effect transistors P23, P24, P31 and P32 form a current mirror where P-channel MOS field effect transistors P23, P31 and P32 mirror the second current through P-channel MOS field effect transistor P24. The $V_{BE}$ node and the IPTAT node are driven to identical voltages by N-channel MOS field effect transistors N25 and N26, which are laid out identically, have the same size, and have the same gate connections. The resistor TCRES1 is positioned between the IPTAT node and the PNP bipolar transistor Q7<0:7> so that the voltage drop across the resistor TCRES1 corresponds to the difference in base-emitter voltages $\Delta V_{BE}$ of the PNP bipolar transistors Q8 and Q7<0:7>.

The voltage across the resistor TCRES1 is proportional to absolute temperature in accordance with the physics of the base-emitter junction temperature. The bandgap reference circuit mirrors the current through the resistor TCRES1, the N-channel MOS field effect transistor N26 and the P-channel MOS field effect transistor P24 to the P-channel MOS field effect transistor P31. The base-emitter voltage $V_{BE}$ of PNP bipolar transistor Q9<0:7> is equal to the base-emitter voltage $V_{BE}$ of PNP bipolar transistor Q7<0:7> because structures are identical, mirroring identical currents so that the current density is the same. The base-emitter voltage $V_{BE}$ of PNP bipolar transistor Q9<0:7> is inversely proportional to absolute temperature. The difference in base emitter voltage $\Delta V_{BE}$ between the PNP bipolar transistors Q8 and Q9<0:7> is proportional to absolute temperature. Therefore the voltage at node RAWGAP is the sum of two voltages. One of the voltages, the base-emitter drop of PNP bipolar transistor Q9<0:7>, is inversely proportional to absolute temperature. The other voltage, the voltage across the resistor TCRES2, is proportional to absolute temperature. The $V_{BE}$ node and the IPTAT node are driven to the same voltage by N-channel MOS field effect transistors N25 and N26. The $V_{BE}$ node is inversely proportional to temperature so that the voltage on the IPTAT node is also inversely proportional to temperature. The $V_{BE}$ of PNP bipolar transistor Q7<0:7> is identical to the $V_{BE}$ of PNP bipolar transistor Q9<0:7>. The current mirrors assure that the currents through the resistors TCRES1 and TCRES2 are equal. The resistance of resistor TCRES1 is greater than the resistance of resistor TCRES2, for example by about ten times in an illustrative circuit, to produce a voltage at the GAP node that is independent of temperature. As a result, the voltage on a reference bandgap node GAP is substantially independent of temperature. Thus, the bandgap reference circuit 102 supplies a temperature-independent reference voltage $V_{REF}$, also called a bandgap voltage $V_{GAP}$, at a reference bandgap node GAP.

The buffer 112 includes an operational amplifier 106. The buffer 112 supplies a temperature-independent buffered reference voltage $V_{BUF}$ at the BUF node in response to application of a reference voltage. Specifically,the buffer 112 buffers the bandgap voltage $V_{GAP}$, receiving $V_{GAP}$ from the band gap reference circuit 102 and generating a buffered voltage $V_{BUF}$ at a BUF node. A resistor TCRES5 sets the voltage gain of the output amplifier stage. The operational amplifier 106 isolates the buffered voltage $V_{BUF}$ of the buffer 112 from external to the power supply independent temperature sensor 100. The operational amplifier 108 farther isolates the signals internal to the power supply independent temperature sensor 100 from external signals. With the power supply independent temperature sensor 100 isolated in this manner, the sensor accurately measures temperature without disturbance from noisy signals arising from external circuits and signal lines.

The biasing circuit 110 includes P-channel MOS field effect transistor P32 and resistor TCRES3. The biasing circuit 110 supplies a temperature-dependent biasing voltage $V_{BIAS}$ at a temperature TEMP signal node. The biasing voltage $V_{BIAS}$ is proportional to absolute temperature and increases linearly as temperature increases so that the biasing voltage $V_{BIAS}$ reflects a basic temperature measurement. However, the biasing voltage $V_{BIAS}$ does not have an offset or slope characteristic that generates an indication of temperature in units of degrees Celsius or Fahrenheit so that some signal conversion is desired. The buffer 112 and the temperature signal amplifier 114, in combination, supply the conversion operation. Specifically,the buffer 112 translates the temperature-independent reference voltage $V_{REF}$ into the buffered voltage $V_{BUF}$ having a low output impedance. The temperature signal amplifier 114 amplifies a differential signal of the buffered reference voltage $V_{REF}$ and the biasing voltage $V_{BUF}$ to generate the output voltage $V_{OUT}$ having a suitable offset and slope to indicate temperature in suitable units.

Temperature signal amplifier 114 includes an operational amplifier 108 and resistors TCRES4 and TCRES5. The temperature signal amplifier 114 supplies a temperature-dependent output voltage $V_{OUT}$ at an output OUT node as a function of the temperature-independent reference voltage $V_{REF}$ and the temperature-dependent biasing voltage $V_{BIAS}$. The operational amplifier 108 has two input terminals, one connected to a temperature-independent signal and a second connected to a temperature-dependent signal. A signal on the PGATE line is controlled to generate the bandgap voltage $V_{GAP}$ that is substantially temperature independent. The bandgap voltage $V'_{GAP}$ is buffered through the buffer 112 to generate the buffered signal at the BUF node. The BUF node voltage is applied to a first input terminal of the operational amplifier 108. A second input terminal of the operational amplifier 108 is connected to a TEMP node that holds a temperature-dependent biasing voltage $V_{BIAS}$. As the temperature of the integrated circuit changes, the buffered voltage $V_{BUF}$ at the BUF node does not change while the temperature-dependent biasing voltage $V_{BIAS}$ at the temperature TEMP node does change, creating a voltage difference that is detected by the operational amplifier 108. The output voltage generated by the operational amplifier 108 is determined by the resistances in the resistance divider formed by the resistor TCRES4 and TCRES5 in combination. Various embodiments of the power supply independent temperature sensor 100 function according to different performance grades, based on the accuracy of the resistors TCRES4 and TCRES5. Expensive, more accurate sensors are typically laser-trimmed to increase accuracy and precisely set the resistance values. A typical accuracy for the power supply independent temperature sensor 100 achieves tolerances with plus or minus 5°C over a full-scale range.

The bandgap power supply circuit 116 supplies a constant supply voltage VSUPPLY, for example 2.4 volts. The bandgap power supply circuit 116 supplies operating power for devices in the power supply independent temperature sensor 100. For example, the operational amplifiers 106 and 108 of the buffer 112 and the temperature signal amplifier 114 respectively have supply terminals connected to the bandgap power supply circuit 116 to supply VSUPPLY power and reference terminals connected to a ground reference $V_{SS}$. Wells of the P-channel MOS field effect transistors P8, P9, P23, P24, P31, P32 are connected to the bandgap power supply circuit 116 and wells of the N-channel MOS field effect transistors N16, N18, N20, N21, N25, N26, and N60 are connected to the ground reference $V_{SS}$. These connections are well known in the integrated circuit arts and are omitted in the illustration to avoid undue complexity.

The current mirror in the bandgap reference circuit 102 and the biasing circuit 110 formed by the P-channel MOS field effect transistors P23, P24, P31 and P32 connected to the PGATE node typically does not perform as a perfect current mirror so that the bandgap voltage $V_{GAP}$ at the reference bandgap node GAP and the buffered voltage $V_{BUF}$ at the BUF node vary as the power supply voltage VSUPPLY varies.

An alternative embodiment of a temperature sensor does not include the bandgap power supply circuit 116 and instead supplies operating power by connecting a power supply terminal to an externally-suppliedIO power supply voltage (VSUPPLY), such as 2.4 volts. The externally-suppliedIO power supply voltage is typically used in circuits that include a significant amount of analog circuitry since a higher voltage is supplied than any available core voltage of the circuit. The higher IO power supply voltage is useful for supplying a suitable voltage or "headroom" to transistor stacks having threshold voltage specifications. Unfortunately, the externally-suppliedIO power supply voltage is not highly stable and typically varies plus or minus ten percent, approximately 300 mV. A disadvantageous result of the variation in supply voltage is that, in some circuits, the greatest proportion of variation in the temperature sensor signal is caused by the variation in supply voltage and not by temperature variations.

To avoid this large variation in supply voltage, the bandgap power supply circuit 116 is included to prevent large variations in power supply voltage while maintaining a suitable voltage range and headroom. In the illustrative embodiment, the bandgap power supply circuit 116 is a bandgap circuit shown in FIG. 2. The bandgap power supply circuit 116 typically maintains a supply voltage of 2.2 to 2.6 volts with a variation of 10 to 30 mV, an order of magnitude (300 mV) less than the variation of a temperature sensor powered directly from the externally-suppliedIO power supply voltage.

Upon application of power, the start-up circuit 104 drives the bandgap reference circuit 102 to a known and stable operating state. The bandgap reference circuit 102 supplies a temperature-independent reference voltage $V_{REF}$ at the reference bandgap node GAP. The buffer 112 supplies a temperature-independent buffered reference voltage $V_{BUF}$ at the BUF node in response to the reference voltage. The biasing circuit 110 supplies a temperature-dependent biasing voltage $V_{BIAS}$ at a temperature TEMP signal node, and the temperature signal amplifier 114 supplies a temperature-dependent output voltage $V_{OUT}$ at an output OUT node as a function of the temperature-independent reference voltage $V_{REF}$ and the temperature-dependent biasing voltage $V_{BIAS}$.

The bandgap reference circuit 102 has three current paths between the bandgap power supply circuit 116 and the ground reference $V_{SS}$. A first current $I_1$ path passes through a first current path made up of P-channel MOS field effect transistor P23, N-channel MOS field effect transistor N25, and PNP bipolar transistor Q8. A second current $I_2$ flows in a second current path that traverses P-channel MOS field effect transistor P24, N-channel MOS field effect transistor N26, and PNP bipolar transistors Q7<0:8> and resistor TCRES1. A third current $I_3$ flows in a third current path includes P-channel MOS field effect transistor P31, PNP bipolar transistors Q9<0:8>, and resistor TCRES2. The biasing circuit 110 forms a fourth current path between the bandgap power supply circuit 116 and ground reference $V_{SS}$ that conducts a through P-channel MOS field effect transistor P32 and resistor TCRES3.

The bandgap reference circuit 102 has two stable operating states, a "no-current" state and a "standard-current" state. In the no-current operating state, P-channel MOS field effect transistors P23, P24, P31, and N-channel MOS field effect transistors N25 and N26 are turned off so that no current other than leakage current flows through the first $I_1$, second $I_2$, or third $I_3$ current paths. In the no-current state, the power supply independent temperature sensor 100 is not in an operating state.

In the standard-currentstable operating state, P-channel MOS field effect transistors P23, P24, and P31, and N-channel MOS field effect transistors N25 and N26 are turned on so that standard operating current flows through the first $I_1$, second $I_2$, and third $I_3$ current paths. In the standard-currentstate the power supply independent temperature sensor 100 operates to measure temperature.

The gates of N-channel MOS field effect transistors N25 and N26 are connected to an NGATE node and the gates of P-channel MOS field effect transistors P23, P24 and P31 are connected to a PGATE node. During power-up, the power supply voltage VSUPPLY ramps up and P-channel MOS field effect transistor P8 turns on when the power supply voltage VSUPPLY exceeds the threshold voltage $V_{TP}$ and effectively connects the power supply voltage VSUPPLY to the gate of N-channel MOS field effect transistor N20. As the power supply voltage continues to ramp up, N-channel MOS field effect transistors N20 and N21 turn on when the power supply voltage VSUPPLY exceeds the combined threshold voltages $3V_{TN}$. When the N-channel MOS field effect transistors N20 and N21 are turned on, the PGATE node is pulled to the threshold voltage $V_{TN}$, turning on P-channel MOS field effect transistors P23, P24 and P31, and causing N-channel MOS field effect transistors N25 and N26 to turn on. Activation of P-channel MOS field effect transistors P23, P24 and P31 and N-channel MOS field effect transistors N25 and N26 initiates current flow through bandgap reference circuit 102.

When the N-channel MOS field effect transistors N20 and N21 turn on and pull the PGATE node to the threshold voltage $V_{TN}$, the P-channel MOS field effect transistor P9 is turned on, causing the N-channel MOS field effect transistors N16 and N18 to turn on. The activated N-channel MOS field effect transistor N18 turns off N-channel MOS field effect transistor N20 and prevents the start-up circuit 104 from diverting current from PGATE node, thereby placing the bandgap reference circuit 102 in the standard-currentstable operating state. In the standard-currentstable operating state, the P-channel MOS field effect transistor P9 mirrors current $I_2$ through the second current path, N-channel MOS field effect transistors N18 and N16 remain turned on, and N-channel MOS field effect transistor N20 remains turned off.

During the standard-currentstable operating state, the P-channel MOS field effect transistors P23, P24, and P31 and N-channel MOS field effect transistors N25 and N26 of the bandgap reference circuit 102 are driven into saturation. P-channel MOS field effect transistors P23, P24, and P31 and N-channel MOS field effect transistors N25 and N26 are matched in size. The N-channel MOS field effect transistors N25 and N26, as N-channel devices, inherently have larger drive currents than P-channel MOS field effect transistors P23 and P24 due to the greater mobility of electrons than holes. The first current $I_1$ and the second current $I_2$ are determined primarily by P-channel MOS field effect transistors P23 and P24, respectively, since N-channel MOS field effect transistors N25 and N26 cannot drive more current than P-channel MOS field effect transistors P23 and P24 supply. The first and third currents, $I_1$ and $I_3$, mirror the second current $I_2$. The first current $I_1$, the second current $I_2$, and the third current $I_3$ are essentially mutually identical. A $V_{BE}$ voltage at the node termed $V_{BE}$ node herein, and a $V_{BE}$ voltage at the node termed the IPTAT node, are inversely proportional to absolute temperature, as is set by the temperature coefficient of PNP bipolar transistor Q8. Since the voltage at NGATE node is applied to the gates of N-channel MOS field effect transistors N25 and N26, and the voltage at PGATE node is applied to the gates of P-channel MOS field effect transistors P23 and P24, the voltage at PGATE node has a far larger influence on the first current $I_1$ and the second current $I_2$ than the voltage at NGATE node. As the temperature increases and the voltage at PGATE node decreases, P-channel MOS field effect transistors P23 and P24 supply more current and the first current $I_1$ and second current $I_2$ increase. As the temperature decreases and the voltage at PGATE node increases, P-channel MOS field effect transistors P23 and P24 supply less current and the first current $I_1$ and the second current $I_2$ decrease. Thus, the first current $I_1$ and the second current $I_2$ are proportional to absolute temperature, as are the third current $I_3$ and the fourth current $I_4$.

Figure 3:
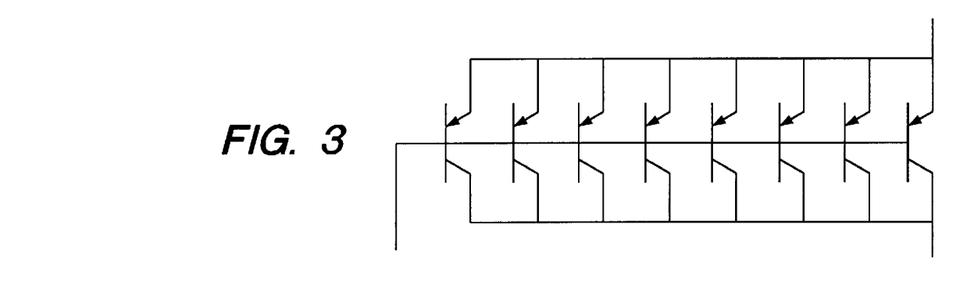
FIG. 3 is a schematic circuit diagram illustrating a diode-connectedPNP bipolar transistor which is suitable for usage in the power supply independent temperature sensor and bandgap power supply circuit shown in FIGS. 1 and 2, respectively.

PNP bipolar transistors Q7<0:8> and Q9<0:8> are compound transistors having eight essentially identical devices connected in parallel that are identical to the single PNP bipolar transistor Q8 so that the PNP bipolar transistors Q7<0:8> and Q9<0:8> are eight times the size of the single PNP bipolar transistor Q8. The eight transistors connected in parallel in the PNP bipolar transistors Q7<0:8> and Q9<0:8> use less base-emitter voltage $V_{BE}$ to sink a given amount of current in comparison to the PNP bipolar transistor Q8. Although PNP bipolar transistors Q7<0:8> and Q9<0:8> are fabricated with a single emitter, base and collector region, in the illustrative embodiment PNP bipolar transistors Q7<0:8> and Q9<0:8> include eight parallel-connected transistors having the same size as PNP bipolar transistor Q8 to provide better matching. FIG. 3 is a schematic circuit diagram illustrating a diode-connected PNP bipolar transistor which is suitable for usage for the transistors Q7<0:7> and Q9<0:7> in the power supply independent temperature sensor 100.

The first current $I_1$ and the second current $I_2$ are essentially identical so that PNP bipolar transistor Q7<0:8> is eight times the size of PNP bipolar transistor Q8 and the current density in PNP bipolar transistor Q8 is eight times the current density in PNP bipolar transistor Q7<0:8>. The temperature coefficient of a base-emitter voltage drop increases to a greater absolute magnitude as the current density decreases. As temperature increases, the base-emitter voltage $V_{BE-Q7<0:8>}$ of PNP bipolar transistor Q7<0:8> decreases more rapidly than the base-emitter voltage $V_{BE-Q8}$ of transistor Q8. However, the voltages at $V_{BE}$ node and IPTAT node are essentially mutually identical. The base-emitter voltage of PNP bipolar transistor Q8 is essentially identical to the voltage drop across resistor TCRES1 plus the base-emitter voltage of PNP bipolar transistors Q7<0:8>. Since the difference between the base-emitter voltages of PNP bipolar transistors Q8 and Q7<0:8> increases as temperature increases, the voltage drop across resistor TCRES1 also increases as temperature increases. The voltage drop across resistor TCRES1 increases as temperature increases not only because the second current increases as temperature increases, but also because resistor TCRES1 has a positive temperature coefficient.

The purpose of the NGATE node and the PGATE node is to create current mirrors, circuits that accurately copy currents. The input current to the output stage of the power supply independent temperature sensor 100 is the current flowing through resistor TCRES1. The voltage at the top of resistor TCRES1 is $V_{BE}$ of PNP bipolar transistor Q8. The voltage at the bottom of resistor TCRES1 is $V_{BE}$ of PNP bipolar transistor Q7<0:7>. Therefore, the voltage across resistor TCRES1 is the difference in base-emitter voltage $\Delta V_{BE}$. The current that flows through resistor TCRES1 is equal to $\Delta V_{BE}$ divided by the resistance. $\Delta V_{BE}$ is known to be proportional to absolute temperature so the current in resistor TCRES1 is also directly proportional to absolute temperature. The current mirror formed by P-channel MOS transistors P24 and P31 directs the same current ($\Delta V_{BE}$/TCRES1) through the resistor TCRES2 and the PNP bipolar transistor Q9<0:7> so the voltage at the node RAWGAP is equal to, as follows:

$$\text{RAWGAP} = V_{BE}(Q9) + \Delta V_{BE} \text{ (TCRES2/TCRES 1)}.$$

$\Delta V_{BE}$ is a voltage that is proportional to absolute temperature which depends on the difference in current density between PNP bipolar transistor Q7<0:7> and PNP bipolar transistor Q8. $V_{BE}$ is a voltage that is inversely proportional to absolute temperature. The multiplier TCRES2/TCRES1 is set suitably and $\Delta V_{BE}$ is added to $V_{BE}$ so that the voltage at the node RAWGAP is temperature independent.

Figure 2:
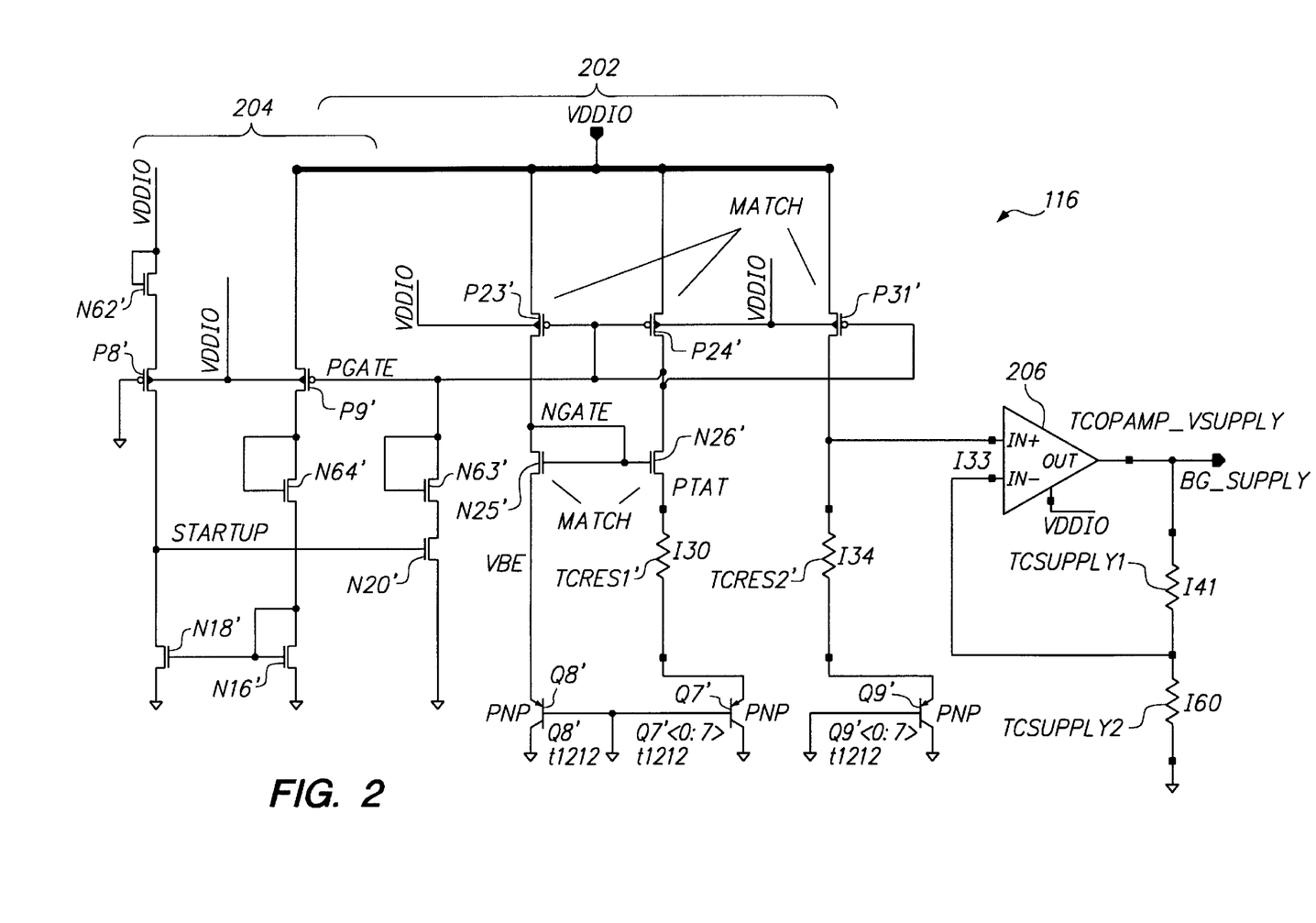
FIG. 2 is a schematic circuit diagram showing an embodiment of a bandgap power supply circuit that is suitable for usage in the power supply independent temperature sensor shown in FIG. 1.

Referring to FIG. 2, a schematic circuit diagram illustrates an embodiment of a bandgap power supply circuit 116 that is suitable for usage in the power supply independent temperature sensor 100. In the illustrative embodiment, the bandgap power supply circuit 116 is similar in form and function to the power supply independent temperature sensor 100 with several of the circuit structures replicated in the bandgap power supply circuit 116. Specifically, like the power supply independent temperature sensor 100, the bandgap power supply circuit 116 includes a start-up circuit 204, a bandgap reference circuit 202, a buffer 206. The bandgap power supply circuit 116 omits a biasing circuit and a temperature signal amplifier.

The start-up circuit 204 has devices that are similar to the start-up circuit 104 including P-channel MOS field effect transistors P8' and P9' and N-channel MOS field effect transistors N16', N18', N20', N62', N63', and N64'. P-channel MOS field effect transistors P8' and P9' are similar to P-channel MOS field effect transistors P8 and P9, but may be sized differently. N-channel MOS field effect transistors N16', N18', N20', N62', N63', and N64' are similar to N-channel MOS field effect transistors N16, N18, N20, N62, N63, and N64, but may be sized differently. The start-up circuit 204 functions in the manner of start-up circuit 104.

The bandgap reference circuit 202 has devices that are similar to the bandgap reference circuit 102 including P-channel MOS field effect transistors P23', P24', and P31', N-channel MOS field effect transistors N25' and N26', resistors TCRES1' and TCRES2', and PNP bipolar transistors Q7'<0:7>, Q8', and Q9'<0:7>. P-channel MOS field effect transistors P23', P24', and P31' are similar to P-channel MOS field effect transistors P23, P24, and P31, but may be sized differently. N-channel MOS field effect transistors N25' and N26' are similar to N-channel MOS field effect transistors N25 and N26, but may be sized differently. Resistors TCRES1' and TCRES2' are similar to TCRES1 and TCRES2, but may be sized differently. PNP bipolar transistors Q7'<O:7>, Q8', and Q9'<0:7> are similar to PNP bipolar transistors Q7<0:7>, Q8, and Q9<0:7>, but may be sized differently. FIG. 3 is a schematic circuit diagram illustrating a diode-connected PNP bipolar transistor which is suitable for usage for the transistors Q7<0:7> and Q9<0:7> in the bandgap power supply circuit 116. The bandgap reference circuit 202 functions in the manner of bandgap reference circuit 102.

The buffer 206 has an output terminal, a noninverting input terminal connected to a reference bandgap node GAP' supplying a bandgap voltage $V_{GAP}'$, and an inverting input terminal connected to the output terminal via a resistor TCSUPPLY1. The inverting input terminal is also connected to ground reference $V_{SS}$ via a resistor TCSUPPLY2. The bandgap power supply circuit 116 supplies a highly constant voltage to the power supply independent temperature sensor 100.

The power connections of the devices and components of the bandgap power supply circuit 116 are connected to an external VDDIO power source.

Referring to FIG. 3, a schematic circuit diagram illustrates a diode-connected PNP bipolar transistor which is suitable for usage for the transistors Q7<0:7> and Q9<0:7> in the temperature sensor shown in FIG. 1 and for the transistors Q7'<0:7> and Q9'<0:7> bandgap power supply circuit shown in FIG. 2.

Figure 4:
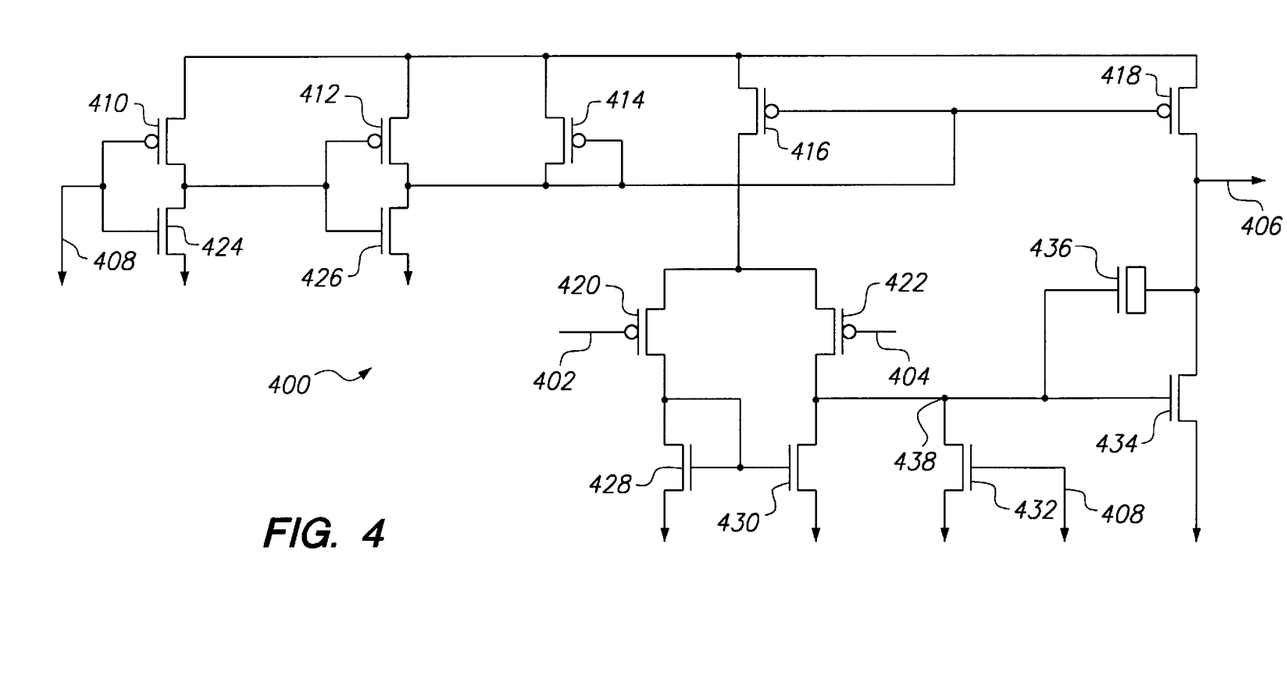
FIG. 4 is a schematic circuit diagram showing an operational amplifier which is suitable for usage in the power supply independent temperature sensor shown in FIG. 1 and suitable for usage in the bandgap power supply circuit shown in FIG. 2.

Referring to FIG. 4, a schematic circuit diagram shows an operational amplifier 400 which is suitable for usage in the power supply independent temperature sensor 100 and suitable for usage in the bandgap power supply circuit 116. The operational amplifier 400 includes an inverting input terminal 402, a non-inverting input terminal 404, an output terminal 406, a plurality of disable terminals 408, a plurality of P-channel MOS field effect transistors 410, 412, 414, 416, 418, 420 and 422, a plurality of N-channel MOS field effect transistors 424, 426, 428, 430, 432, and 434, and a capacitor 436. The disable terminals 408 are connected to ground, deactivating the disable function. In an operational amplifier 400 used in the power supply independent temperature sensor 100, the wells of the P-channel transistors are connected to the bandgap power supply circuit 116. In an operational amplifier 400 used in the bandgap power supply circuit 116, the wells of the P-channel transistors are connected to the external VDDIO power source. In operational amplifiers 400 used in both the power supply independent temperature sensor 100 and the bandgap power supply circuit 116, the wells of the N-channel transistors are connected to ground. The well connections are not shown in FIG. 4 to avoid complexity since such connections are well known in the semiconductor arts.

Figure 5:
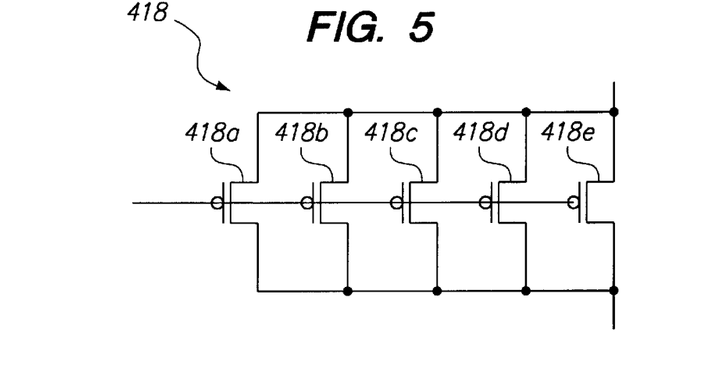
FIGS. 5 and 6 are schematic circuit diagrams illustrating field effect transistors which are suitable for usage in the operational amplifier shown in FIG. 4.
Figure 6:
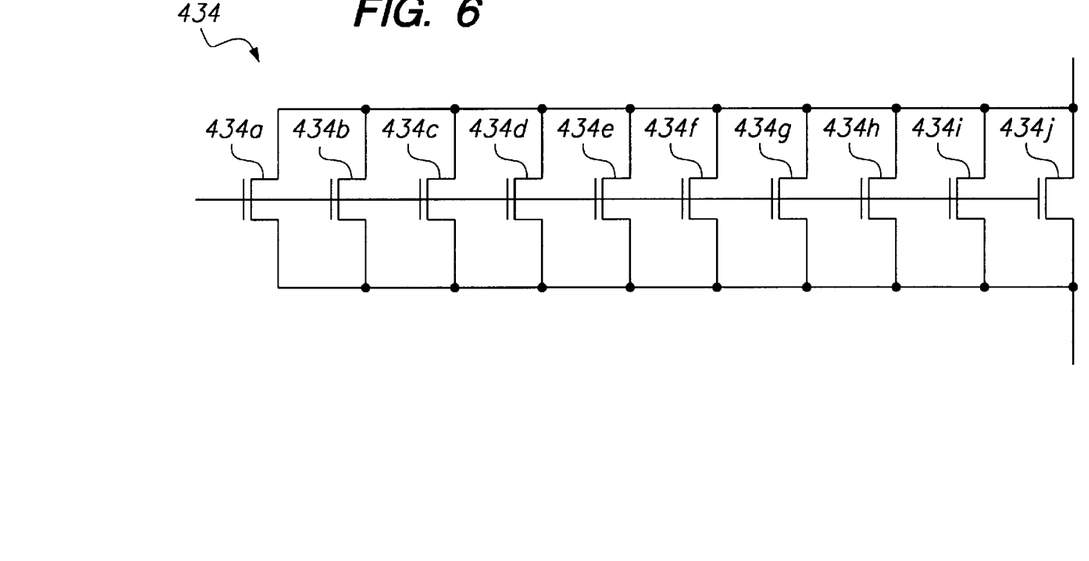

Transistors 418 and 434 are relatively large and drive an output signal. Although in some embodiments the transistors 418 and 434 are fabricated with a single source, drain, and channel region, in the illustrative embodiment shown in FIGS. 5 and 6, the transistor 418 includes five parallel-connected transistors 418a, 418b, 418c, 418d and 418e, and the transistor 434 includes ten parallel-connected transistors 434a, 434b, 434c, 434d, 434e, 434f, 434g, 434h, 434i and 434j to attain better matching.

Referring again to FIG. 4, the capacitor 436 is an N-channel MOS field effect transistor with the gate forming a first electrode and the source, drain and channel forming a second electrode.

Transistors 416, 420, 422, 428, and 430 form a differential input stage for adjusting the voltage at a node 438 to change the drive current of transistor 434. When the voltage at inverting input terminal 402 exceeds the voltage at non-inverting input terminal 404, the voltage at node 438 rises, transistor 434 sinks more current, and the voltage at output terminal 406 decreases. Similarly when the voltage at non-inverting input terminal 404 exceeds the voltage at inverting input terminal 402, the voltage at node 438 falls, transistor 434 sinks less current, and the voltage at output terminal 406 increases. The operational amplifier 400 has a voltage gain of approximately 60 decibels at low frequencies, assuming no external feedback between the input and output terminals.

Suitable values for resistors in the power supply independent temperature sensor 100 are determined through simulation, modeling, and by adjustment of the values of some resistors to calibrate the output voltage within a fraction of a degree and account for the temperature coefficients of the resistors. The adjustable resistors are integrated resistors, such as diffused resistors or well resistors, that are selectively interconnected by programmable junctions or switches in the final metal layer on an integrated circuit chip. During wafer fabrication, the initial metal layers such as metal-1 and metal-2 layers are usually the most difficult metal layers to fabricate. After a batch of wafers are processed to the final metal layer, such as a metal-5 or metal-6 layer, a few experimental wafers are fabricated with the final metal layer and rapidly tested to evaluate the performance of the temperature sensor. Once optimal resistor values are determined, the final metal layer is defined to selectively open and close the programmable junctions to set optimal resistor values. Remaining wafers are fabricated with highly accurate temperature sensors.

Referring to FIGS. 7, 8, 9, and 10, top plan schematic views of resistors are shown that are suitable for usage in the power supply independent temperature sensor 100 including resistors TCRES1, TCRES2, TCRES3, TCRES4, and TCRES5, and suitable for usage in the bandgap power supply circuit 116 including resistors TCRES1', TCRES2', TCSUPPLY1, and TCSUPPLY2. The resistive blocks include one or more diffused resistors. In the illustrative embodiment, the diffused resistors are doped P+ in an N-well, have a width of 5 microns, and a length of 4 microns. The sheet resistance of the P+ regions is 90Ω/sq. The diffused resistors have a resistance of 72 ohms, but the resistance is temperature-dependent. The diffused resistors are doped by a boron implant operation that is primarily used to form heavily doped source and drain regions for the P-channel transistors. Blocks labeled "1x" represent a single diffused resistor. Blocks labeled "2x" represent two series-connected diffused resistors with a combined resistance of 144 ohms. Blocks labeled "4x" represent four series-connected diffused resistors with a combined resistance of 288 ohms. Larger resistors are formed by forming additional series-connected resistors. The additional resistors are similar in form to the diffused resistors but smaller.

Figure 7:
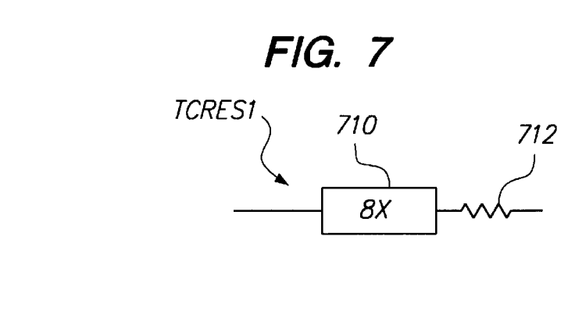
FIGS. 7, 8, 9, and 10 are top plan schematic views of resistors which are suitable for usage in the power supply independent temperature sensor shown in FIG. 1 and suitable for usage in the bandgap power supply circuit shown in FIG. 2.

Referring to FIG. 7, resistor TCRES1 is a non-programmable resistor provided by the series connection of resistive block 710 and resistor 712. In an illustrative embodiment, resistor 712 has a resistance of 23 ohms. Resistive block 710 has a resistance of 576 ohms, so that resistor TCRES1 has a resistance of about 600 ohms.

Figure 8:
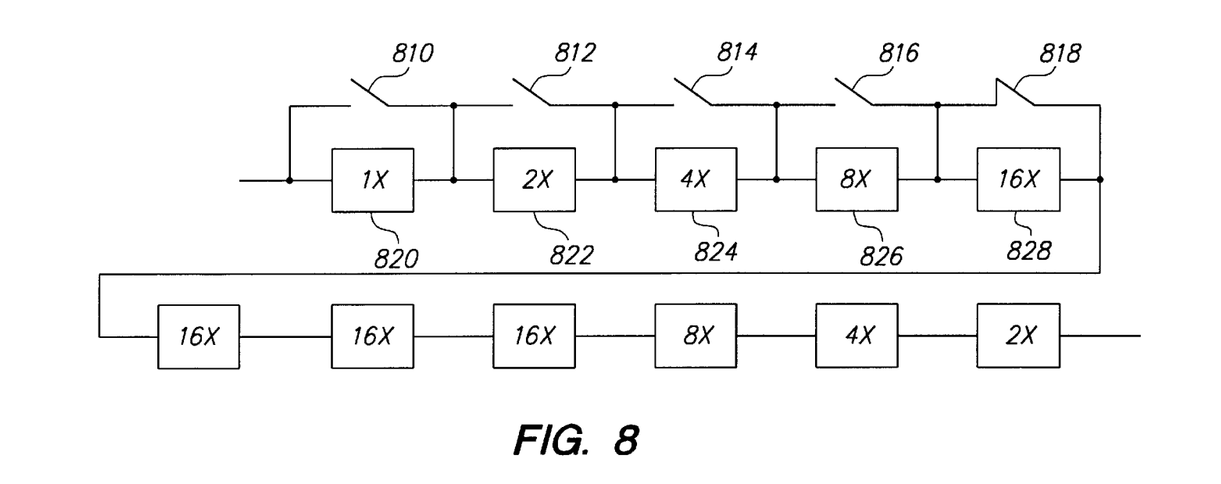

Referring to FIG. 8, resistor TCRES2 includes programmable junctions 810, 812, 814, 816 and 818 for resistive blocks 820, 822, 824, 826 and 828, respectively. Closing the switches to short-circuit the programmable junctions routes current around the resistive blocks. Opening the programmable junctions forces the current through the resistive blocks. In the illustrative embodiment, programmable junctions 810, 812, 814 and 816 are opened, and programmable junction 818 is closed. Resistive blocks 820, 822, 824 and 826 are programmably selected for resistor TCRES2, and resistive block 828 is programmably removed from resistor TCRES2. Resistive blocks 820, 822, 824 and 826 add a combined resistance of 15×72 ohms, or 1028 ohms to resistor TCRES2, and resistive block 828 adds no resistance to resistor TCRES2.

Figure 9:
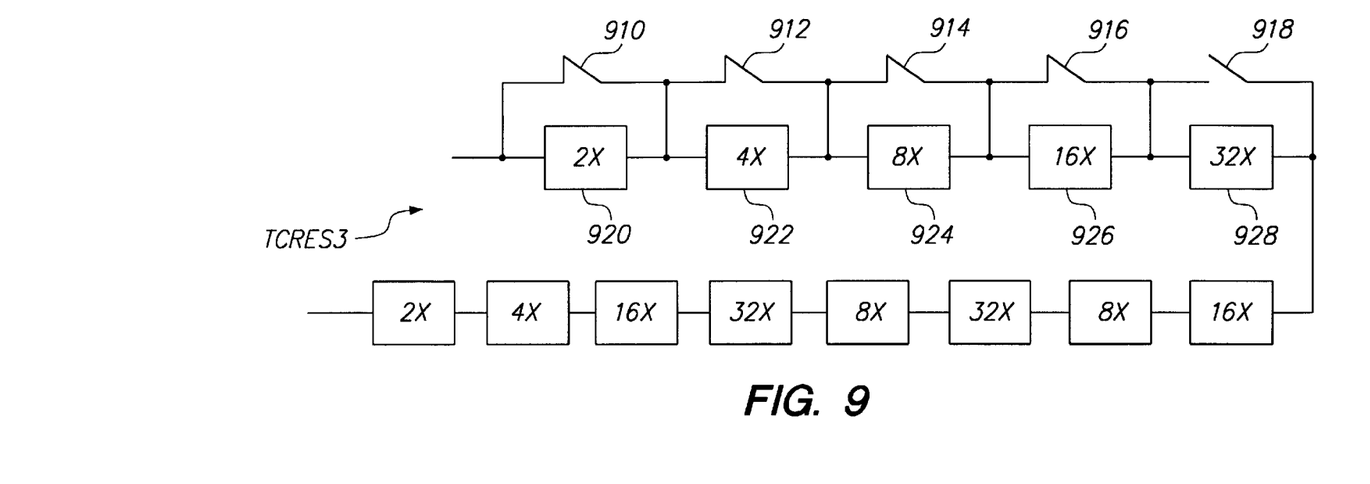

Referring to FIG. 9, programmable junctions 910, 912, 914, and 916 programmably remove resistive blocks 820, 822, 824, and 826, respectively, from resistor TCRES3, and programmable junction 918 programmably selects resistive block 928 for resistor TCRES3.

Figure 10:
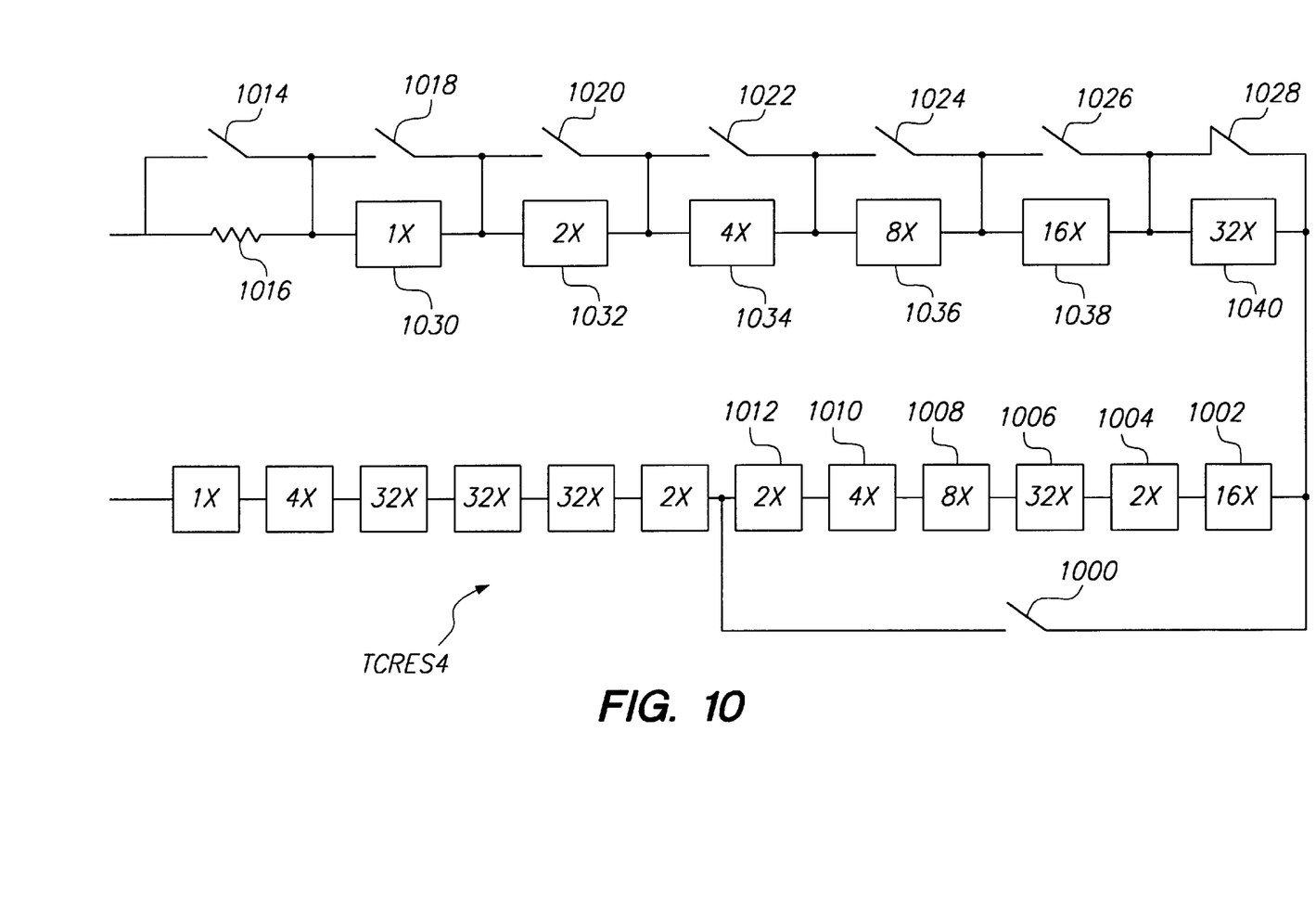

Referring to FIG. 10, resistor TCRES4 is a programmable resistor. Resistor TCRES5 is not programmable. Using the illustrated settings, programmable junction 1000 is opened and programmably selects resistive blocks 1002, 1004, 1006, 1008, 1010, and 1012 for resistor TCRES4. Programmable junction 1014 is opened and selects additional resistor 1016, which is one-half the size of a 1x resistive block and has a resistance of 36 ohms, for resistor TCRES4. Similarly, programmable junctions 1018, 1022, and 1026 are opened, and programmable junctions 1020, 1024, and 1028 are closed, selecting resistive blocks 1030, 1034, and 1038 for resistor TCRES4, and deselecting resistive blocks 1032, 1036, and 1040 from resistor TCRES4.

Figure 11:
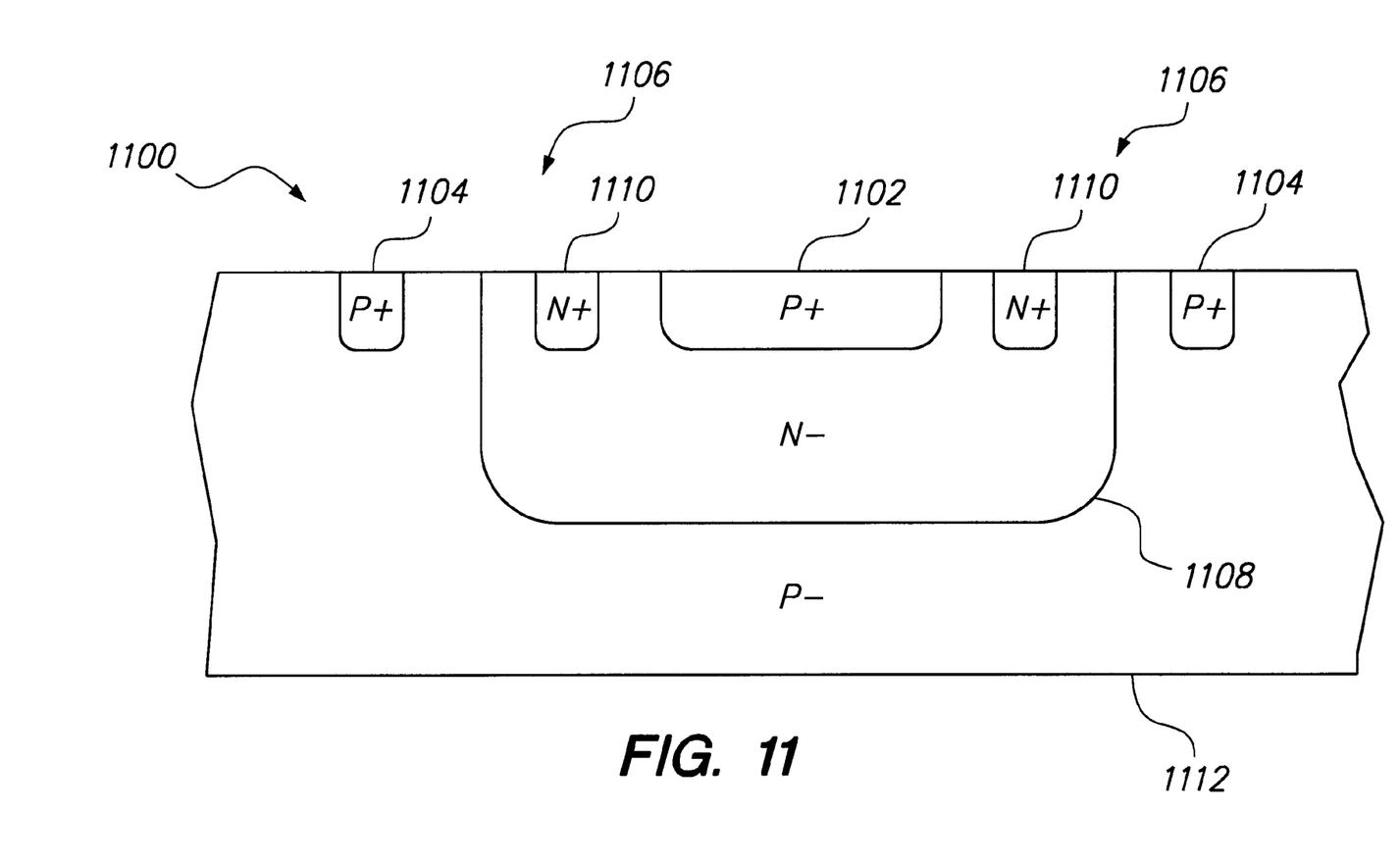
FIG. 11 is a schematic cross-sectional view showing a bipolar transistor which is suitable for usage in the power supply independent temperature sensor shown in FIG. 1 and suitable for usage in the bandgap power supply circuit shown in FIG. 2.

Referring to FIG. 11, a schematic cross-sectional view shows a bipolar transistor 1100 which is suitable for usage in the power supply independent temperature sensor and suitable for usage in the bandgap power supply circuit. The bipolar transistor 1100 includes a P+ emitter 1102, a P+ collector 1104, and a base 1106 that includes N− base region 1108 and N+ base region 1110. The bipolar transistor 1100 is formed in P− epitaxial surface layer 1112 over a P+ layer (not shown). Base region 1110 is a ring within base region 1108 that is displaced from and surrounds an emitter 1102. A collector 1104 is a ring within epitaxial surface layer 1112 that is displaced from and surrounds the base region 1108. The base region 1108 is doped during a phosphorus implant step that forms N-wells for the P-channel transistors. The base region 1110 is formed during an arsenic implant that forms heavily doped source and drain regions for the N-channel transistors. The emitter 1102 and collector 1104 are doped during a boron implant step that forms heavily doped source and drain regions for the P-channel transistors. It is notable that the bipolar transistor 1100 is fabricated using a purely CMOS process. Other bipolar transistors in the power supply independent temperature sensor 100 are similarly formed using a CMOS process.

Figure 12:
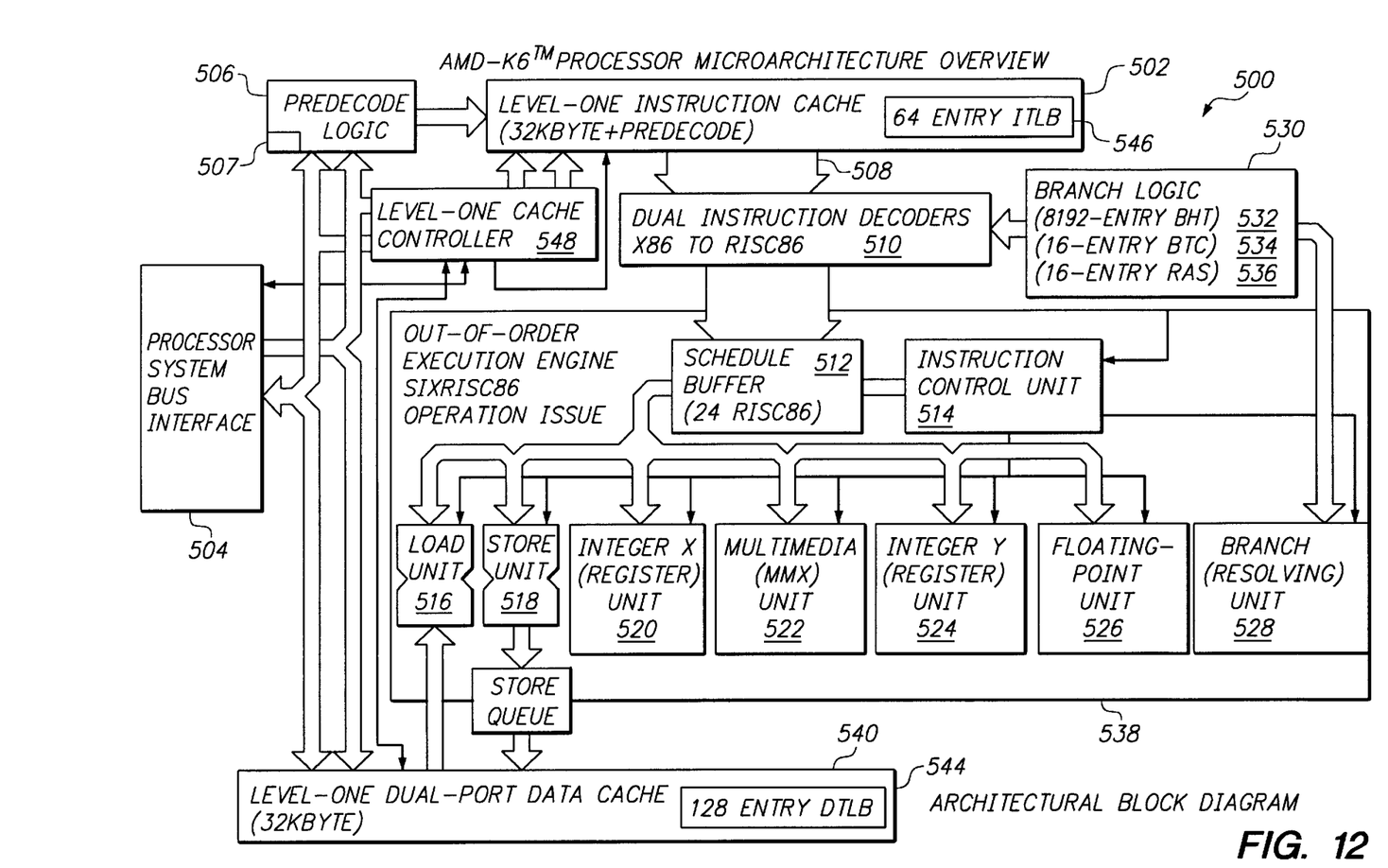
FIG. 12 is an architectural block diagram which illustrates an embodiment of a microprocessor in accordance with an embodiment of the present invention.

Referring to FIG. 12, a schematic block diagram illustrates an embodiment of an AMD-K6 microprocessor 500. The microprocessor 500 is an X86 instruction set-compatible microprocessor implementing a set of Multi-Media eXtenstions (MMX). A level-one (L1) instruction cache 502 begins predecoding instructions obtained from a processor system bus interface 504 during filling of the 32KB two-way associative L1 instruction cache 502. The L1 instruction cache 502 includes a 64-entry instruction translational lookahead buffer (ITLB) 546. Bypass (not shown) and storage buffers (not shown) for instructions (4×16) and predecode (4×20) to the L1 instruction cache 502 are supplied to allow data-in and data flow-back to cache output terminals.

A level-one cache controller 548 controls caching in the L1 instruction cache 502. The L1 instruction cache 502 uses a Most Recently Used (MRU) prediction technique to predict the way selection on cache accesses. A misprediction in the way selection results in a penalty of one cycle. The L1 instruction cache 502 line replacement algorithm is Least Recently Used (LRU) although an alternative random replacement algorithm is supported using an SR5.ICERLR configuration bit. The L1 instruction cache 502 also supports a direct-mapped replacement algorithm, reducing the cache size from 32 KB to 16 KB, using an SR5.ICDM configuration bit.

The L1 instruction cache 502 performs a simple prefetching algorithm. When a line miss occurs, as distinguished from a sub-block miss, and the miss occurs on sub-block 0 of the line (bit[5] of the address is 0), then both sub-blocks are fetched and pipelined on the bus.

The microprocessor 500 includes predecode logic 506 and a predecode cache 507 to identify instruction boundaries and fill the L1 instruction cache 502. Once the L1 instruction cache 502 is filled, predecode bits are stored in the 20 kB predecode cache 507. Predecode bits resolved during the predecoding operation are stored in a 20 KB predecode cache 507. Predecode logic 506 includes a first stage of instruction decode logic. Data from the L1 instruction cache 502 are fetched by fetch logic 508 and transferred to dual instruction decoders 510. The dual instruction decoders 510 decodes up to two X86 instructions per clock and translates most instructions through a direct hardware decode operation into from one to four RISC-like operations, called RISC86 Ops. The hardware-decoded instructions are generally simple and common-type instructions. Other complex or uncommon instructions are mapped into ROM-resident sequences of RISC Ops using emulation code ROM translation.

Decoded instructions from the dual instruction decoders 510 are transferred to a RISC86 Op Scheduler and buffer 512. The RISC86 Op Scheduler 512 holds up to 24 RISC Ops and stores a total of 48 registers using register renaming. The Scheduler 512 contains logic to track instructions from decode to retirement, determining dependencies, scheduling execution, and committing architectural state. The Scheduler 512 is structured as a FIFO queue with instructions entering the queue four at one time to match the macroinstruction decoder bandwidth and up to four instructions retiring at one time at the end of the queue. Instructions enter the Scheduler 512 after decoding or fetching and remain in the scheduler queue until retirement. The Scheduler 512 queue is a general structure for usage for all categories of instructions and thus serves to hold instructions directed to different execution units. The Scheduler 512 utilizes implicit register renaming, which is based on position within the queue rather than explicit tag assignments, so that the Scheduler 512 avoids usage of full renaming hardware.

The Scheduler 512 manages creation and termination of operands using a hardware structure that is similar to a carry tree of a binary adder to improve speed performance, generating a carry bit for each operand while a most recent retiring or writing operation for a register terminates the carry bit. If a carry is made into a RISC86 Op and the destination of the RISC86 Op matches the operand, then that RISC86 Op is selected to supply the operand. The carry tree structure creates group generate Ggrp[7:0] and group propagate Pgrp[7:0] terms 3-RISC86 Op groups. The selection of 3-RISC86 Op groups is convenient since 24 RISC86 Ops are allocated in the Scheduler 512. The eight group terms are combined in a three-level tree to create a group carry in terms Cgrp[7:0]. The group carry terms Cgrp[7:0] are used within each group to select the operand source Op.

The RISC86 Op Scheduler 512, under control of an instruction control unit 514, issues up to six RISC86 Operations using out-of-order issuing to seven parallel execution units. The execution units speculatively execute the RISC86 Ops to generate results. The RISC86 Op Scheduler 512 retires the results in-order. The execution units include a load unit 516, a store unit 518, an integer X register unit 520, a Multi-Media eXtension (MMX) unit 522, an integer Y register unit 524, a floating-point unit (FPU) 526, and a branch resolving unit 528. A branch logic unit 530 implements a branch prediction operation that uses two-level branch prediction based on an 8192-entry Branch History Table (BHT) 532, a 16-entry Branch Target Cache (BTC) 534, and a 16-entry Return Address Stack (RAS) 536.

The dual instruction decoders 510 translate X86 instructions on-the-fly into corresponding RISC86 Ops. The RISC86 Ops are executed by an instruction core 538 that is essentially a RISC superscalar processing engine. The fetch logic 508 fetches up to sixteen instruction bytes each cycle from the L1 instruction cache 502 and transfers the instruction bytes into an instruction buffer (not shown) preceding the dual instruction decoders 510 so that the instruction buffer is maintained at capacity. The dual instruction decoders 510 accesses the instruction bytes from the instruction buffer, decodes up to two X86 instructions, immediately recognizes and predicts branches, and generates up to four RISC86 Ops. The RISC86 Ops are loaded into the unified RISC86 Op Scheduler 512. The RISC86 Op Scheduler 512 controls and tracks multiple aspects of RISC86 Op issue and execution.

The microprocessor 500 executes up to six operations per clock. Each cycle up to six RISC86 Ops are issued and executed in a pipelined manner. The six RISC86 Ops may include one memory read operation, one memory write operation, two integer and/or one multi-media register operation, one floating point operation, and one evaluation of a branch condition. The RISC86 Ops are executed out-of-order and are executed subject principally to actual dependencies and resource constraints. One example of a resource constraint is that a maximum of two integer register operations (RegOps) is executed per cycle. Once execution of the RISC86 Ops is complete, the RISC86 Op Scheduler 512, functioning as a reorder buffer, commits the RISC86 Ops in-order to ensure precise exception handling and full operational compatability with X86 architecture standards. The RISC86 Op Scheduler 512 performs implicit register renaming based upon position within the scheduler buffer (queue) rather than explicit tag assignments that are conventionally employed in systems that use a reorder buffer. The position-based register renaming reduces the size of renaming hardware. The RISC86 Op Scheduler 512 has a first-in-first-out (FIFO) buffer physical structure and performs implicit register renaming, characteristics which, in combination, advantageously permit the use of fast position-based instruction issue and dependency-tracking logic. The dependency-tracking logic has characteristics of many fast adder circuits in which the process of searching for a particular operand is similar to the arithmetic operation of propagating a carry through an adder.

The load unit 516 loads data via a level-one (L1) dual-port data cache 540 which receives data from an external memory (not shown) via the processor system bus interface 504. Bypass (not shown) and storage buffers (not shown) for data (4×16) to the data cache 540 are supplied to allow data-in and data flow-back to cache output terminals.

The data cache 540 includes a 128-entry data translational lookahead buffer (DTLB) 544. The data cache 540 is a 2-way set-associative, 32 KB size cache with a 64 byte line-size and 32-byte sub-blocking. The data cache 540 fills on the basis of the 32-byte sub-block units. In contrast to the L1 instruction cache 502, the data cache 540 uses a Least Recently Missed (LRM) selection technique which is generally a more accurate way selection scheme than the LRU technique of the L1 instruction cache 502. In the LRM scheme, the line that first enters the cache is replaced. An alternative random replacement algorithm is supported and activated through usage of a SR5.DCERLR configuration bit. The data cache 540 also supports a direct-mapped replacement algorithm, reducing the cache size from 32 KB to 16 KB, using an SR5.DCDM configuration bit.

The data cache 540 supports write allocation, which is disabled by setting an SR5.WAD configuration bit. Write allocation is allowed when caching is enabled through miscellaneous cache enable/disable bits and either of two conditions is true. A first condition is that a write operation hits on a line but misses on the requested sub-block. The second condition is that a write operation missed on a line but hit on a one-page cacheability control register used specifically on write-allocate operations. The cacheability control register is invalidated during RESET, translation lookahead buffer invalidations, or cache invalidations initiated by an INVD/WBINVD instruction. Snoop invalidations do not affect the cacheability control register. The cacheability control register is updated/validated on every fill with the page address of the line that was filled into the cache upon initiation by a load operation. Another cacheability control register is validated on write operations to the bus when the writes are determined to be cacheable.

The data cache 540 supports one read operation and one write operation on each cycle to either independent or dependent addresses. Stalls occur on cache misses or when a data dependency occurs that is not handled by hardware. For example, a stall takes place upon the occurrence of a read operation with a superset dependency on an older write operation that has not yet been cached. A superset dependency is defined as a read operation that requests more bytes than a write operation can supply. Address dependencies are detected by monitoring the number of requested bytes and a limited number of address bits (address bits [9:0]) due to timing constraints so that false dependencies may be detected, resulting in unnecessary stalls.

The store unit 518 transfers data to the data cache 540 through a store queue 542.

The MMX unit 522 is implemented to incorporate an X86 instruction subset called the Multi-Media eXtensions (MMX) thereby supporting a growing number of applications in the areas of communications and multimedia. The MMX unit 522 supports the new instructions and the new data types that are defined by the MMX standard to increase processor performance in the targeted applications. The MMX unit 522 executes a Single Instruction, Multiple Data (SIMD) technique to process multiple operands of 8, 16, or 32 bits in a 64-bit data path to perform highly parallel and computationally intensive algorithms that are typical for multimedia applications. The MMX unit 522 supports 57 new instructions that execute additions, subtractions, multiplies, multiply-accumulates, logical shifts, arithmetic shifts, and several other operations. Most operations are executed on operands of any data type.

In the illustrative embodiment, the power supply independent temperature sensor 100 and a microprocessor 500 are embedded in a single integrated circuit chip implemented in CMOS technology. The power supply independent temperature sensor 100 and the microprocessor 500 share the same semiconducting substrate and are mutually integral so that the power supply independent temperature sensor 100 advantageously senses a temperature that is highly correlated and essentially identical to the microprocessor temperature.

A power supply independent temperature sensor that is integral with a microprocessor has many advantages in a computer system. For example, when the output signal of the temperature sensor indicates an operating temperature of the microprocessor that exceeds a predetermined temperature, a warning signal may be issued to a user. A warning message, possibly displayed visually on a monitor, informs a system user that the microprocessor or computer system will automatically shut down after a certain time interval. Alternatively, the warning message may notify the user that overheating has occurred and let the user decide on a response.

In another example, the output signal of the power supply independent temperature sensor may be compared to a predetermined temperature limit. When the limit is exceeded, a signal is generated and input to the microprocessor. The microprocessor may issue a command to a clock generator to reduce the microprocessor clock speed, reducing the operating temperature of the microprocessor as the microprocessor continues to execute. Alternatively, a control signal may be passed to a cooling system, such as a fan, that supplies additional cooling to the microprocessor.

A digital signal measured from the power supply independent temperature sensor using an analog-to-digital converter, for example, may be stored in a nonvolatile memory of the microprocessor to supply a thermal history of the microprocessor or to indicate the times that the microprocessor exceeds a set limit.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

What is claimed is:

1. A temperature sensor, comprising:
   a bandgap reference circuit generating a temperature-independent reference voltage;
   a biasing circuit coupled to the bandgap reference circuit and including a current mirror mirroring a current in the bandgap reference circuit, the biasing circuit generating a temperature-dependent biasing voltage;
   a bandgap power supply circuit coupled to the bandgap reference circuit and coupled to the biasing circuit, the bandgap power supply circuit supplying a constant supply voltage to the bandgap reference circuit and the biasing circuit; and
   an amplifier coupled to the bandgap reference circuit and the biasing circuit, the amplifier generating a temperature-dependent output voltage as a function of the reference voltage and the biasing voltage.

2. A temperature sensor according to claim 1 further comprising:
   a buffer coupled to the bandgap reference circuit and the amplifier.

3. A temperature sensor according to claim 2 wherein:
   the buffer includes an operational amplifier for translating the temperature-independent reference voltage to a buffered voltage having a low output impedance;
   the amplifier includes an operational amplifier for amplifying a differential signal of the buffered voltage and the temperature-dependent biasing voltage.

4. A temperature sensor according to claim 2 wherein:
   the buffer includes an operational amplifier for translating the temperature-independent reference voltage to a buffered voltage having a low output impedance;
   the amplifier includes an operational amplifier for amplifying a differential signal of the buffered voltage and the temperature-dependent biasing voltage, the buffer translating the independent reference voltage to generate an indication of temperature in units of degrees Celsius or Fahrenheit.

5. A temperature sensor according to claim 1 wherein:
   the bandgap power supply circuit further includes:
      a power supply bandgap reference circuit generating a power supply temperature-independent reference voltage.

6. A temperature sensor according to claim 5 wherein:
   the bandgap power supply circuit further includes:
      a buffer coupled to the power supply bandgap reference circuit and coupled to supply operating power to the bandgap reference circuit and the biasing circuit.

7. A temperature sensor according to claim 5 wherein:
   the power supply bandgap reference circuit and the bandgap reference circuit are mutually similar in structure.

8. A temperature sensor according to claim 1 wherein:
   the bandgap reference circuit includes a first current path, a second current path, and a third current path,
      the first current path including a first current path FET and a first current path diode-connected bipolar transistor coupled to the first current path FET;
      the second current path including a second current path FET and a second current path diode-connected bipolar transistor coupled to a second current path resistor, the second current path resistor coupled to the second current path FET;
      the third current path including a third current path FET and a third current path diode-connected bipolar transistor coupled to a third current path resistor, the third current path resistor coupled to the third current path FET; and
      the first current path FET, the second current path FET, and the third current path FET being current mirror FETs.

9. A temperature sensor according to claim 8 wherein:
   a base-emitter voltage of the first current path diode-connected bipolar transistor supplies a first voltage that decreases as temperature increases;
   a base-emitter voltage of the second current path diode-connected bipolar transistor and a voltage across the second current path resistor in combination supply a second voltage that is essentially identical to the first voltage; and
   a base-emitter voltage of the third current path diode-connected bipolar transistor and a voltage across the third current path resistor in combination supply the reference voltage.

10. A temperature sensor according to claim 1 wherein:
    the bandgap power supply circuit further includes:
       a power supply bandgap reference circuit generating a power supply temperature-independent reference voltage,
       the power supply bandgap reference circuit including a first current path, a second current path, and a third current path,
          the first current path including a first current path FET and a first current path diode-connected bipolar transistor coupled to the first current path FET;
          the second current path including a second current path FET and a second current path diode-connected bipolar transistor coupled to a second current path resistor, the second current path resistor coupled to the second current path FET;
          the third current path including a third current path FET and a third current path diode-connected bipolar transistor coupled to a third current path resistor, the third current path resistor coupled to the third current path FET; and the first current path FET, the second current path FET, and the third current path FET being current mirror FETs.

11. A temperature sensor according to claim 10 wherein:
a base-emitter voltage of the first current path diode-connected bipolar transistor supplies a first voltage that decreases as temperature increases;
a base-emitter voltage of the second current path diode-connected bipolar transistor and a voltage across the second current path resistor in combination supply a second voltage that is essentially identical to the first voltage; and
a base-emitter voltage of the third current path diode-connected bipolar transistor and a voltage across the third current path resistor in combination supply the reference voltage.

12. A temperature sensor according to claim 1 wherein:
the temperature-dependent output voltage is proportional to absolute temperature.

13. A temperature sensor according to claim 1 wherein:
the temperature sensor is fabricated in a CMOS technology.

14. A single integrated circuit chip comprising:
a microprocessor; and
a temperature sensor including:
a bandgap reference circuit generating a temperature-independent reference voltage;
a biasing circuit coupled to the bandgap reference circuit and including a current mirror mirroring a current in the bandgap reference circuit, the biasing circuit generating a temperature-dependent biasing voltage;
a bandgap power supply circuit coupled to the bandgap reference circuit and coupled to the biasing circuit, the bandgap power supply circuit supplying a constant supply voltage to the bandgap reference circuit and the biasing circuit; and
an amplifier coupled to the bandgap reference circuit and the biasing circuit, the amplifier generating a temperature-dependent output voltage as a function of the reference voltage and the biasing voltage.

15. A single-chip integrated circuit comprising:
a substrate wafer having a plurality of semiconductor devices and components fabricated in a CMOS technology and forming:
a microprocessor; and
a temperature sensor including:
a bandgap reference circuit generating a temperature-independent reference voltage;
a biasing circuit coupled to the bandgap reference circuit and including a current mirror mirroring a current in the bandgap reference circuit, the biasing circuit generating a temperature-dependent biasing voltage;
a bandgap power supply circuit coupled to the bandgap reference circuit and coupled to the biasing circuit, the bandgap power supply circuit supplying a constant supply voltage to the bandgap reference circuit and the biasing circuit; and
an amplifier coupled to the bandgap reference circuit and the biasing circuit, the amplifier generating a temperature-dependent output voltage as a function of the reference voltage and the biasing voltage.

16. A single-chip integrated circuit according to claim 15 wherein:

the bandgap power supply circuit further includes:
a power supply bandgap reference circuit generating a power supply temperature-independent reference voltage.

17. A single-chip integrated circuit according to claim 16 wherein:
the bandgap power supply circuit further includes:
a buffer coupled to the power supply bandgap reference circuit and coupled to supply operating power to the bandgap reference circuit and the biasing circuit.

18. A single-chip integrated circuit according to claim 16 wherein:
the power supply bandgap reference circuit and the bandgap reference circuit are mutually similar in structure.

19. A single-chip integrated circuit according to claim 15 wherein:
the bandgap power supply circuit further includes:
a power supply bandgap reference circuit generating a power supply temperature-independent reference voltage,
the power supply bandgap reference circuit including a first current path, a second current path, and a third current path,
the first current path including a first current path FET and a first current path diode-connected bipolar transistor coupled to the first current path FET;
the second current path including a second current path FET and a second current path diode-connected bipolar transistor coupled to a second current path resistor, the second current path resistor coupled to the second current path FET;
the third current path including a third current path FET and a third current path diode-connected bipolar transistor coupled to a third current path resistor, the third current path resistor coupled to the third current path FET; and
the first current path FET, the second current path FET, and the third current path FET being current mirror FETs.

20. A single-chip integrated circuit according to claim 19 wherein:
a base-emitter voltage of the first current path diode-connected bipolar transistor supplies a first voltage that decreases as temperature increases;
a base-emitter voltage of the second current path diode-connected bipolar transistor and a voltage across the second current path resistor in combination supply a second voltage that is essentially identical to the first voltage; and
a base-emitter voltage of the third current path diode-connected bipolar transistor and a voltage across the third current path resistor in combination supply the reference voltage.

21. A method of sensing temperature in a single-chip integrated circuit comprising:
generating a temperature-independent reference voltage using a bandgap reference circuit;
mirroring a current in the bandgap reference circuit;
generating a temperature-dependent biasing voltage as a function of the mirrored current; and
determining a differential voltage between the temperature-independent reference voltage and the temperature-dependent biasing voltage;
generating a temperature-dependent output voltage as a function of the differential voltage; and supplying a constant voltage to improve the accuracy of the reference voltage and biasing voltage operations.

22. An integrated circuit comprising:

means for sensing temperature including:
- means for generating a temperature-independent reference voltage using a bandgap reference circuit;
- means for mirroring a current in the bandgap reference circuit;
- means for generating a temperature-dependent biasing voltage as a function of the mirrored current; and
- means for determining a differential voltage between the temperature-independent reference voltage and the temperature-dependent biasing voltage;
- means for generating a temperature-dependent output voltage as a function of the differential voltage; and
- means for supplying a constant voltage to improve the accuracy of the reference voltage and biasing voltage operations.

* * * * *